United States Patent
Balaraman et al.

(10) Patent No.: US 11,797,399 B2
(45) Date of Patent: Oct. 24, 2023

(54) PLUG-IN BASED FRAMEWORK TO PROVIDE FAULT TOLERANCE AND HIGH AVAILABILITY IN DISTRIBUTED SYSTEMS

(71) Applicant: VMWARE, INC., Palo Alto, CA (US)

(72) Inventors: Krishnamoorthy Balaraman, Bangalore (IN); Rahul Kumar Singh, Bangalore (IN); Shruti Basu, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/590,839

(22) Filed: Feb. 2, 2022

(65) Prior Publication Data

US 2023/0176951 A1  Jun. 8, 2023

(30) Foreign Application Priority Data

Dec. 3, 2021  (IN) .............................. 202141056240

(51) Int. Cl.
| | |
|---|---|
| G06F 11/00 | (2006.01) |
| G06F 11/14 | (2006.01) |
| G06F 11/07 | (2006.01) |
| G06F 9/50 | (2006.01) |
| G06F 11/30 | (2006.01) |
| G06F 11/20 | (2006.01) |

(52) U.S. Cl.
CPC ........ *G06F 11/1484* (2013.01); *G06F 9/5083* (2013.01); *G06F 11/0772* (2013.01); *G06F 11/2023* (2013.01); *G06F 11/3006* (2013.01)

(58) Field of Classification Search
CPC ............ G06F 11/1484; G06F 11/0772; G06F 11/2023; G06F 11/3006
See application file for complete search history.

(56) References Cited

U.S. PATENT DOCUMENTS

| | | | | |
|---|---|---|---|---|
| 10,754,750 | B1* | 8/2020 | Chopra | G06F 11/3034 |
| 2020/0110667 | A1* | 4/2020 | Al-Alem | G06F 11/1438 |
| 2022/0156162 | A1* | 5/2022 | Reyes | G06F 11/3006 |
| 2022/0156164 | A1* | 5/2022 | Gunjikar | G06F 11/2056 |

* cited by examiner

*Primary Examiner* — Michael Maskulinski
(74) *Attorney, Agent, or Firm* — SU IP CONSULTING (57) ABSTRACT

A plug-in based framework provides high availability (HA), including fault tolerance, in a distributed system, such as provided by a virtualized computing environment. The framework uses blueprints that define entities to be monitored, failure conditions, failover actions, restoration actions, and other aspects associated with HA. Microservices execute the blueprints, and a load balancer may balance the execution of the blueprints amongst microservices.

21 Claims, 6 Drawing Sheets

PLUG-IN BASED FRAMEWORK TO PROVIDE FAULT TOLERANCE AND HIGH AVAILABILITY IN DISTRIBUTED SYSTEMS

RELATED APPLICATION

Benefit is claimed under 35 U.S.C. 119(a)-(d) to Foreign Application Serial No. 202141056240 filed in India entitled "PLUG-IN BASED FRAMEWORK TO PROVIDE FAULT TOLERANCE AND HIGH AVAILABILITY IN DISTRIBUTED SYSTEMS", on Dec. 3, 2021, by VMware, Inc., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

Virtualized computing environments may be implemented as distributed systems, such as a distributed storage system; a hyperconverged infrastructure (HCI) environment, which combines elements of a traditional data center: storage, compute, networking, and management functionality; or other type of distributed system in which physical and/or virtual network devices are arranged in a distributed manner across the system (including clusters of hosts that may reside at the same and/or different geographic regions).

High availability (HA) features are typically provided in distributed systems. For example, if there is a failure of a VM at a host, the VM may be rebooted/restarted on that host. As another example, if the host itself has failed, the VMs on the failed host may be restarted at another host in the same or different cluster. In this manner, HA provides fault tolerant capability to reduce the impacts of failures on users of the distributed system.

However, it is challenging to efficiently and effectively implement HA features (including fault tolerance) for distributed systems that may have different users with varying architectural/operational requirements and other customization needs.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

The present disclosure addresses the drawbacks associated with implementing high availability (HA) to provide protection in a distributed system. For example, a system that needs HA typically implements the HA feature from scratch. To determine how to implement HA in a distributed system, at least the following are taken into consideration: the entities (e.g., clusters, hosts, VMs, other components/elements in a virtualized computing environment, etc.) of the distributed system for which HA is being provided, ways to predict/detect failures in the distributed system, and how to take remedial actions when failures occur in the distributed system so as to ensure HA for the entities being protected.

However, current HA frameworks are tightly coupled with respect to the entities being provided with HA capability in the distributed system, the failure modes that are to be detected, and the actions to be taken in the event of a failure. For example, a distributed system may be configured with HA capability for only VMs and applications, with the HA being able to detect and handle host, datastore, and network failures (e.g., failure modes). It takes considerable development effort to modify this HA capability so as to accommodate/add other components in the distributed system for HA protection and/or to support/handle other types of failure modes. For instance, considerable development effort may be needed to add special failover handling for certain classes of VMs.

Therefore, the embodiments described herein reduce the amount of development effort, by providing a plug-in based framework/architecture. According to this plug-in based framework, a generic HA approach is provided that enables users to define and easily/efficiently/quickly build HA functionality that is customized to their requirements, thereby reducing the cost and effort involved in enhancing, extending, and maintaining the HA capabilities of an existing system.

As will be described further below, the plug-in based HA framework uses blueprints and services (such as microservices) that execute the blueprints. The blueprints and/or other components of the HA framework may be provided as a service in a cloud environment, for instance with blueprints and/or microservices being able to be downloaded from the cloud environment and installed as plug-ins in the users' distributed systems. This enables the users' HA capability to be more easily upgraded and maintained, with reduced downtime.

Computing Environment

In some embodiments, the plug-in based HA framework may be provided in and for a virtualized computing environment or other type of distributed system. In other embodiments, the plug-in based HA framework may be provided in and for other types of computing environment (which may not necessarily involve a virtualized computing environment). For the sake of illustration and explanation, the various embodiments will be described below in the context of a distributed storage system provided by a virtualized computing environment.

Figure 1:
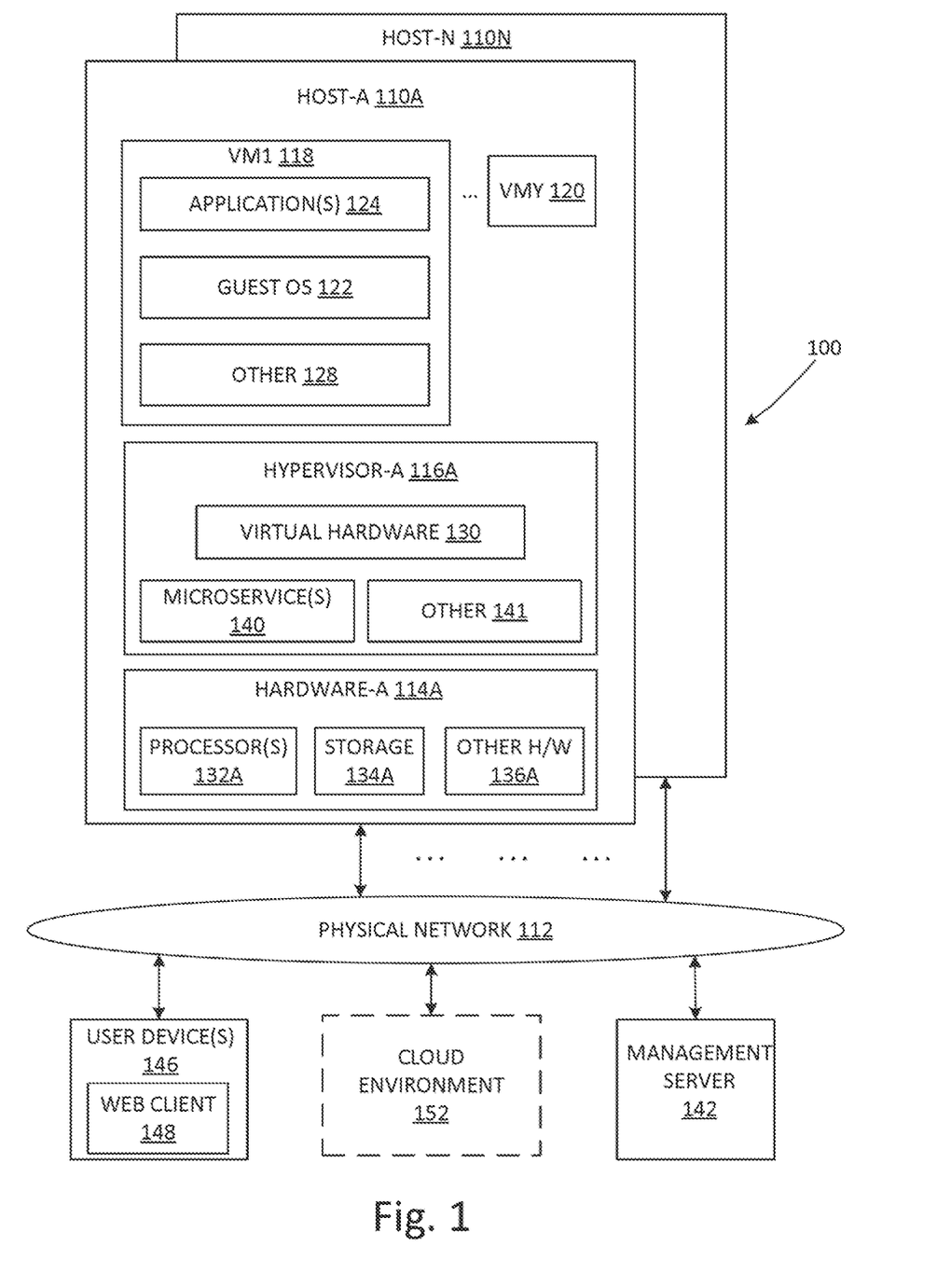
FIG. 1 is a schematic diagram illustrating an example virtualized computing environment in which a plug-in based framework for high availability (HA) may be implemented.

For instance, FIG. 1 is a schematic diagram illustrating an example virtualized computing environment 100 in which a plug-in based framework for HA may be implemented. Depending on the desired implementation, the virtualized computing environment 100 may include additional and/or alternative components than that shown in FIG. 1.

In the example in FIG. 1, the virtualized computing environment 100 includes multiple hosts, such as host-A 110A host-N 110N that may be inter-connected via a physical network 112, such as represented in FIG. 1 by interconnecting arrows between the physical network 112 and host-A 110A host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMY 120, wherein Y (as well as N) is an integer greater than or equal to 1. In practice, the virtualized computing environment 100 may include any number of hosts (also known as "computing devices", "host computers", "host devices", "physical servers", "server systems", "physical machines," etc.), wherein each host may be supporting tens or hundreds of virtual machines. For the sake of simplicity, the details of only the single VM1 118 are shown and described herein.

VM1 118 may include a guest operating system (OS) 122 and one or more guest applications 124 (and their corresponding processes) that run on top of the guest operating system 122. VM1 118 may include still further other elements, such as a virtual disk, agents, engines, modules, and/or other elements 128 usable in connection with operating VM1 118. In some implementations, the other elements 128 in VM1 118 and/or in other virtualized computing instances (including containers) running on host-A 110A may include/execute blueprints and microservices, alternatively or additionally to such blueprints/microservices residing elsewhere on host-A 110A or elsewhere in the virtualized computing environment 100. Blueprints and microservices will be described in further detail later below.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs. The hypervisor-A 116A of some implementations may include/execute one or more microservices 140 that operate in conjunction with blueprints, in a manner that will be described in further detail later below. The microservice(s) 140 may reside in the hypervisor-A 110A (such as depicted in FIG. 1 by way of example), alternatively or additionally to residing in the VM(s) of host-A 110, and/or may reside elsewhere in the host-A 110A, and/or may reside elsewhere in the virtualized computing environment 100 (e.g., at another host, at a dedicated standalone device, etc.).

The hypervisor-A 116A may include or may operate in cooperation with still further other elements 141 residing at the host-A 110A. Such other elements may include drivers, agent(s), daemons, engines, virtual switches, blueprints, and other types of modules/units/components that operate to support the functions of the host-A 110A and its VMs.

Hardware-A 114A includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 in VM1 118. Corresponding to the hardware-A 114A, the virtual hardware 130 may include a virtual CPU, a virtual memory, a virtual disk, a virtual network interface controller (VNIC), etc.

A cloud environment 152 may be connected to each of the host-A 110A . . . host-N 110N. For example, each of the host-A 110A host-N 110N may access the cloud environment 152 via the physical network 112. According to some embodiments, blueprints and/or microservices may be stored/published in the cloud environment 152, for download and installation by the host-A 110A . . . host-N 110N. For instance, vendors, developers, a service provider for the virtualized computing environment 100, system administrators, and/or other parties may upload blueprints or microservices to the cloud environment so as to make these blueprints/microservices available as plug-ins to users or other consumers of the functionality (including HA capability) of the virtualized computing environment 100. As such, HA capability using blueprints and microservices can be provided to such users/consumers as a service via the cloud environment 152.

A management server 142 or other management entity of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster of hosts. The management server 142 may be operable to collect usage data associated with the hosts and VMs, to configure and provision VMs, to configure and provision hosts/devices, to activate or shut down VMs, to monitor health conditions and diagnose and remedy operational issues that pertain to health, to support HA-related operations, and to perform other managerial tasks associated with the operation and use of the various elements in the virtualized computing environment 100.

The management server 142 may be a physical computer that provides a management console and other tools that are directly or remotely accessible to a system administrator or other user. The management server 142 may be communicatively coupled to host-A 110A . . . host-N 110N (and hence communicatively coupled to the virtual machines, hypervisors, hardware, etc.) via the physical network 112. The host-A 110A . . . host-N 110N may in turn be configured as a datacenter that is also managed by the management server 142. In some embodiments, the functionality of the management server 142 (including cloud management capability in some embodiments) may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMY 120 (including operating the applications 124), using a web client 148. The user device 146 can be in the form of a computer, including desktop computers and portable computers (such as laptops and smart phones). In one embodiment, the user may be an end user or other consumer that uses services/components of VMs (e.g., the application 124, etc.) and/or the services or other functionality provided by the cloud environment 152. The user may also be a system administrator that uses the web client 148 of the user device 146 to remotely communicate with the management server 142 or the cloud environment 152 via a management console for purposes of performing management operations.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

With respect to HA capability (including fault tolerance), various configurations are possible in the virtualized computing environment 100. In one example, a VM (and its data/functionality) residing at a host may be backed up by another VM at the same host or at a different host. In another example, a host (including its VMs and other components) may be backed up by another host in the same cluster or in a different cluster of hosts. A cluster may be backed up by a cluster in the same geographic area or in a different geographic area. These are but a few examples of HA framework, and the blueprints and microservices described herein can be configured to operate in conjunction with varying HA arrangements/framework.

Blueprints, Microservices, and Load Balancing in a HA Framework

According to various embodiments of a HA framework, blueprints, microservices, and load balancing are provided as components of the HA framework. With these components (such as via blueprints), users of the virtualized computing environment 100 are provided with capability to define at least one or more of the following:

An entity (e.g., a VM, application, process, host, cluster, storage array, network switch, etc.) in the virtualized computing environment 100 that needs high availability;

A meaning of high availability for a particular entity (e.g., a VM is defined to be available if the VM is accessible to a user and to the management server 142);

A failure in the virtualized computing environment 100, such as when an entity is about to become unavailable or is already unavailable (e.g., a host on which a VM is running is defined to have failed if that host is not reachable by the management server or by other hosts);

How the HA framework can detect a failure in the virtualized computing environment 100 (e.g., a VM does not respond after a predetermined number of attempts to reach the VM fail);

A failover action that the HA framework should execute in response to a failure (e.g., a failover action for an entity, such as a VM, is to restart the VM on another host that is reachable from the management server 142 and other hosts). A failover action may be defined to be temporary (e.g., performed while the original entity is in a failed state, and may be reversed via a restoration action, described below, when the failed entity has recovered from the failure);

How the HA framework can detect when recovery from a (transient) failure has occurred (e.g., a previously failed original host has come back online), and so a restoration action can be performed; and/or A restoration action that reverses the failover action that was executed in response to the failure, if the user wishes to bring the virtualized computing environment 100 and/or its previously failed entity back to a state that existed before the failure. For instance, a blueprint may specify that a recovery action is to move the VM back to the original host that has come back online.

Blueprints may be used to provide the foregoing and/or other definitions. According to some embodiments, blueprints may be in the form of files that are comprised of computer-executable but human-readable instructions, and may provide a fundamental unit of abstraction in the HA framework.

As explained above, various aspects, features, etc. in the HA framework may be expressed/defined by blueprints. Furthermore, blueprints may be used as the formal specification of the sequence of actions to implement by the HA framework in a workflow, as well as defining each individual action themselves.

According to various embodiments, blueprints may be made available in cloud environment 152 for consumption by users of the virtualized computing environment 100. Other approaches can be taken to provide blueprints for the virtualized computing environment 100, such that users can access and install/use the blueprints in their HA framework.

Figure 2:
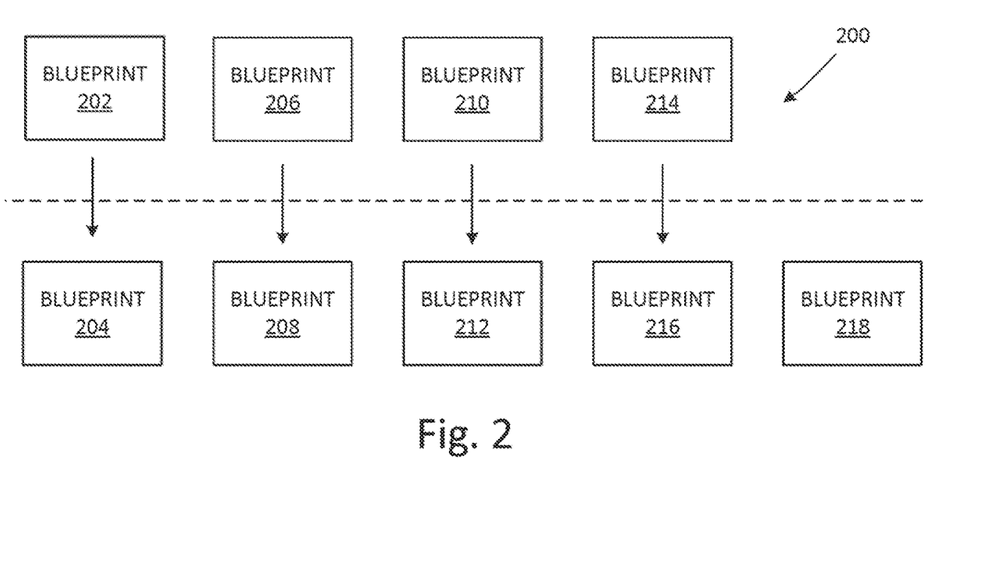
FIG. 2 shows examples of blueprints that may be provided and used by users in the virtualized computing environment of FIG. 1.

FIG. 2 shows examples of blueprints 200 that may be provided and used by users in the virtualized computing environment 100. The blueprints 200 may have varying levels of content, development, and detail. For instance, a blueprint 202 may be downloaded from the cloud environment 152 and implemented/installed (collectively depicted by a dashed line and arrows in FIG. 2) as a blueprint 204 that is substantially intact/unmodified in substance by the users; another blueprint 206 may have a relatively basic template format and is then modified with further details by the user so as to generate a modified blueprint 208; another blueprint 210 may be relatively detailed and is then modified by the user to add, remove, or revise its content so as to generate a modified blueprint 212 that extends, narrows, or otherwise modifies the blueprint 210; another blueprint 214 may be significantly changed by the user so as to generate a blueprint 216 that is effectively a complete replacement of the blueprint 214; and a blueprint 218 may be a blueprint that is freshly generated by the user without being based on any previous blueprint(s).

Such are just a few examples of the types of blueprints that may be provided and used in the virtualized computing environment 100. With these blueprints as shown and described with respect to FIG. 2, the requirements and definitions needed by each user can be easily customizable to meet requirements from one user to another. A user interface (e.g., provided by the web client 148 in the user device 146 of FIG. 1) may be operated by the users to access each blueprint for customization, such as via an application program interface (API) and/or other tool(s). Such customization is difficult and/or not possible/efficient with conventional techniques that require significant development time to hard code various HA features into an HA framework.

Figure 3:
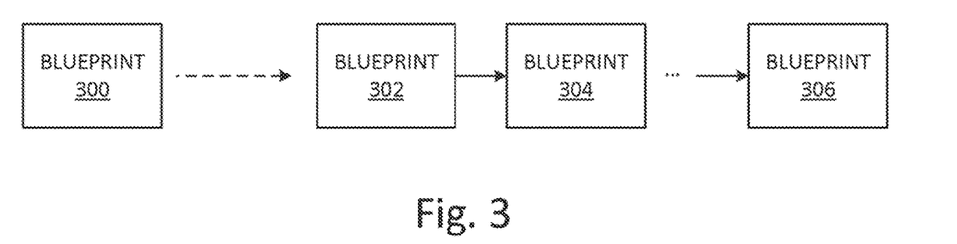
FIG. 3 shows a first example implementation wherein a blueprint provides an instruction to execute other blueprints in a specified order.

Blueprints may also be nested. For example, FIG. 3 shows a first implementation wherein a blueprint 300 provides an instruction (depicted by an arrow with broken lines) to execute other blueprints 302, 304, . . . and 306 in a specified order (depicted by arrows with solid lines).

Figure 4:
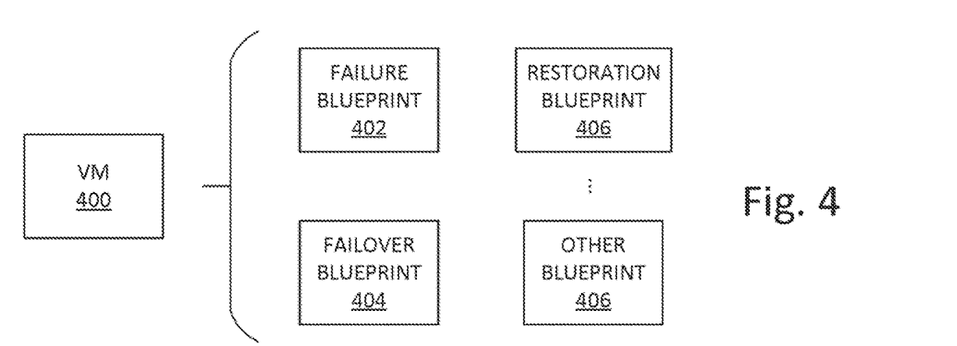
FIG. 4 shows a second example implementation wherein a particular entity may have multiple blueprints associated with it.

As another example, FIG. 4 shows a second implementation wherein a particular entity may have multiple blueprints associated with it. For instance, a VM 400 may have associated with it multiple blueprints 402, 404, 406, . . . and 408 that each respectively define an aspect of providing HA to the VM. Such blueprints may respectively define, for example, a failure condition to be monitored, a failover action, a restoration action, or other blueprint (and alternatives or multiple options thereof) for the VM, as well specifying the actions and sequence of actions to execute in a HA workflow.

As still another example, multiple blueprints may be provided for the same logical reason/idea for a single entity. For instance, a VM may have multiple failure detection blueprints defined for the VM: a blueprint for a VM process crash, a blueprint for an application crash, a blueprint for excessive CPU utilization, etc.

Blueprints of various embodiments, though executable, do not run by themselves. Accordingly, one or more services or other types of discrete or standalone computer-executable code/instructions that may be provided in order to execute the blueprints. Such services/code/instructions may include microservices in some embodiments, and such microservices form another component part of the HA framework described herein. For ease of explanation and by way of illustration, microservices will be described throughout this disclosure as the components that execute blueprints.

Microservices of various embodiments contain additional logic to execute one or more blueprints defined by a HA workflow. For instance, a set of microservices may perform operations of monitoring, failover orchestration (e.g., deciding the failover actions to take), failover action (e.g., executing the failover actions), restoration orchestration (e.g., deciding the restoration actions to take after a failed entity has recovered from a failure), and restoration action (e.g., executing the restoration actions).

Microservices may be downloaded from the cloud environment 152 and installed by users into hosts, etc. of the virtualized computing environment 100, such as in the form of plug-ins. Microservices may also be obtained from sources other than the cloud environment 152 and installed in the virtualized computing environment 100. It is also possible for microservices to be created and installed (e.g., programmed) directly into hosts etc. of the virtualized computing environment, without obtaining the microservices from an external source.

Figure 5:
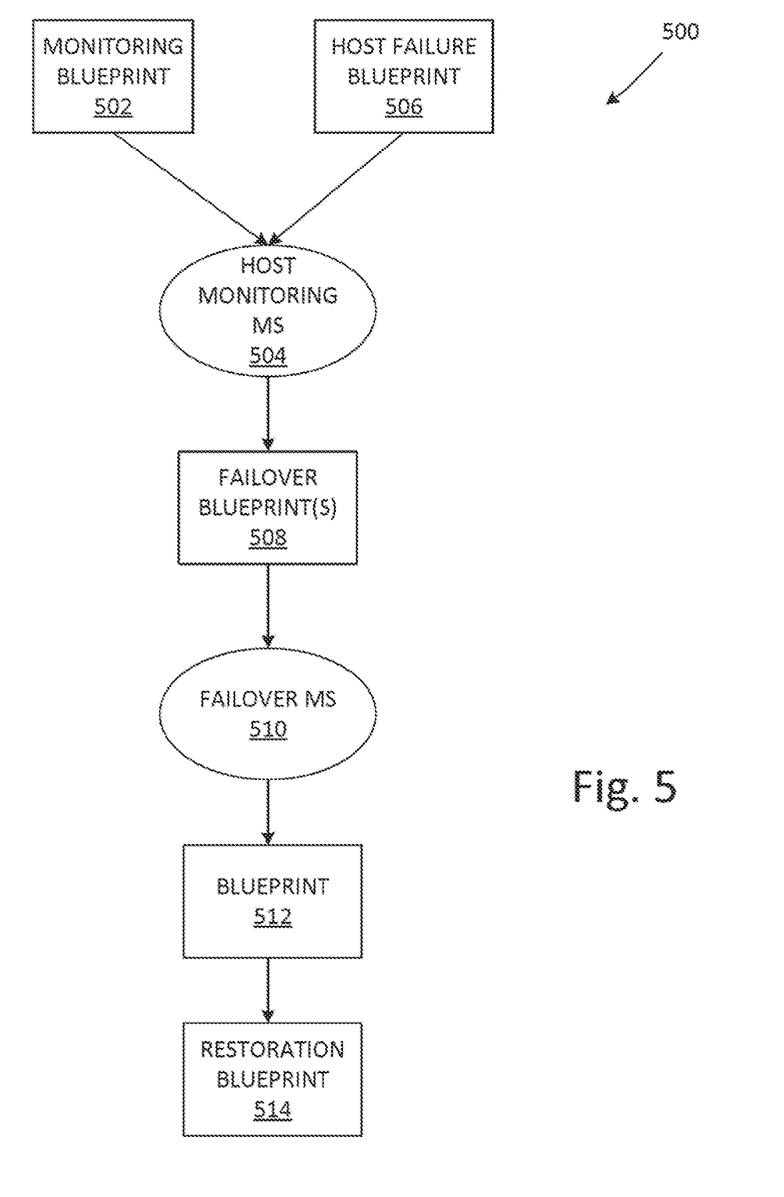
FIG. 5 is a diagram providing an example of an arrangement/interaction between blueprints and microservices.

FIG. 5 is a diagram providing an example of an arrangement/interaction 500 between blueprints and microservices, in the context of providing HA for a host. A monitoring blueprint 502 may specify the entity to be monitored (e.g., specifies which hosts to be monitored), as well as specifying API endpoints that implement a host monitoring microservice (MS) 504. One or more host failure blueprints 506 (which may also be the same as the monitoring blueprint 502 in some implementations) may define a failure condition on a host, and specify an action of monitoring of the host(s) for the failure condition(s). The host failure monitoring microservice 504 then executes the monitoring blueprint 502 and the host failure blueprint 506 to monitor the host(s) for failures. The host failure monitoring microservice 504 also provides an endpoint that can be used by users to start/stop the microservice 504 itself, and also for determining the status of the entity being monitored.

When a particular monitored host fails, the failure monitoring microservice 504 detects the failure and may instantiate VM failover blueprints 508 for each VM on the failed host, and may publish these failover blueprints 508 in a queue or via other location/technique. In this manner, a failover microservice 510 monitoring the queue may detect the failover blueprints 508 and execute the failover actions in the order specified in the failover blueprints 508.

A further blueprint 512 can define a recovery condition of the failed entity. When the monitoring microservice 504 or the failover microservice 510 (or other microservice) detects the recovery condition specified in the blueprint 512, such microservice can execute a restoration action specified in a restoration blueprint 514.

The restoration blueprint 514 may specify a set of restoration actions and the order in which the restoration actions are to be executed by the microservice, after a failed entity has recovered from a failure, so as to return the failed entity (e.g., the original host) and/or other related component (such as a VM that was running on the host prior to the failure) to a state that existed prior to the failure. In the case of a VM, the restoration action may be to restart the VM on the host that has now recovered, to restart the VM on another (different) host at the datacenter, or to restart the VM on another host at a different datacenter. In the case of the host, a recovery action may be to invoke an autoscaling service to provision more hosts and/or other resources (e.g., memory, processors, etc.) so as to meet load balancing requirements or capacity requirements, such as if the VM is unable to be restarted on the original host and so has to be restarted on a different newly provisioned host, or if load balancing requirements dictate that the VM be restarted on other hosts, etc.

Furthermore, the failover microservice 510 or other microservice of various embodiments may orchestrate the execution of a restoration action with transactional guarantees and retry attempts. For instance, the restoration blueprint 514 may specify a number of retry attempts (e.g., a number of attempts to restart the VM on the original host) for a first restoration action that is to be performed first, before moving on to try a second restoration action (e.g., performing autoscaling so as to provision more hosts/resources in such a manner that the VM may be restarted on the original hosts or on a different host). A transactional guarantee, for example, may guarantee that a number of retry attempts will be made before performing some other restoration action, may guarantee that a certain number of additional hosts or resources may be added if autoscaling is to be performed, may guarantee a level of throughput or bandwidth or other performance condition as a result of a restoration action, etc.

Thus, the example of FIG. 5 depicts a manner in which a set of microservices 504 and 510 and others may be chained together to implement HA as defined by a set of blueprints 502, 506, 508, 512, and 514. FIG. 5 also further illustrates an example HA workflow and how different blueprints may be sequentially instantiated/executed at different stages of the HA workflow.

According to various embodiments, there may be an M:N relationship between monitoring blueprints and restoration blueprints, between monitoring blueprints and failover blueprints, between failover blueprints and restoration blueprints, etc. This M:N relationship need not be a 1:1 ratio. For example, multiple failure scenarios (specified by monitoring blueprints) may use the same failover blueprint or restoration blueprint. It is also possible to provide a blueprint for this mapping (e.g., the M:N relationship).

As another example, the same single failure scenario (specified by a monitoring blueprint) can have multiple restoration blueprints associated with it. For instance, the failure microservice can choose a second restoration blueprint if repeated attempts to successfully execute a restoration action specified in a first restoration blueprint fails. If multiple attempts to restart a VM (as specified in the first restoration blueprint) fail, the second restoration blueprint can invoke an autoscaling service to add more resources to the cluster. As another example, the failure microservice can select and execute a restoration blueprint based on context (resource availability, cost of executing the restoration blueprint against a budget for provisioning additional resources/hosts, etc.).

Another component of the HA framework according to various embodiments is a load balancer. Load balancing capability may be provided by way of a load balancing engine, which may comprise one of the other components 141 at hypervisor-A 116A of host-A 110A or which may reside elsewhere in the virtualized computing environment 100 (such as at the management server 142).

The load balancing engine may be configured to maintain a specific number of microservices in the HA framework, and also to balance the execution of blueprints amongst multiple microservices. The load balancing engine may also be implemented as a microservice that executes a load balancer blueprint.

Figure 6A:
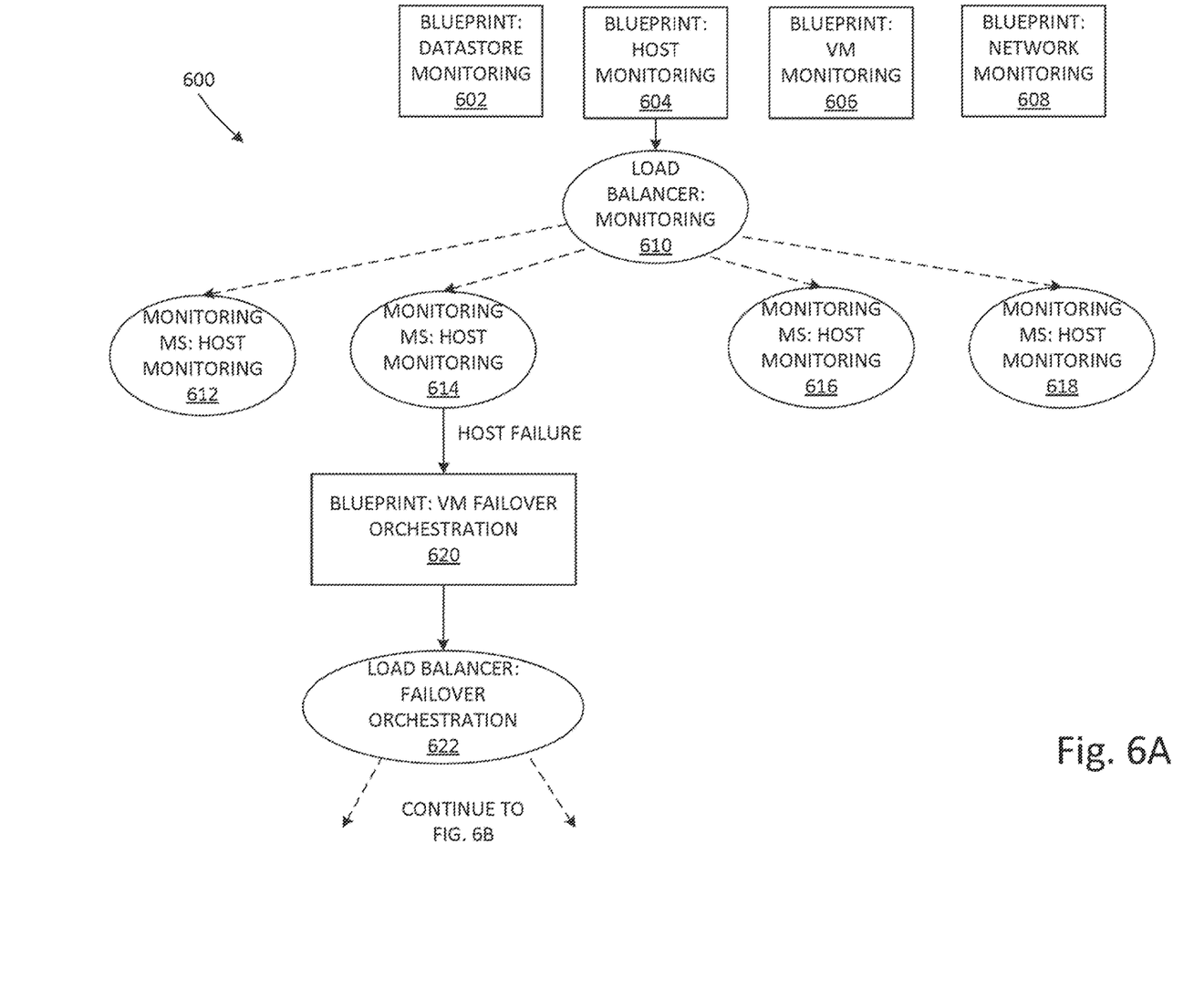
FIGS. 6A and 6B show a diagram of an implementation of blueprints, microservices, and a load balancer in a HA framework, in the context of providing HA for a host.
Figure 6B:
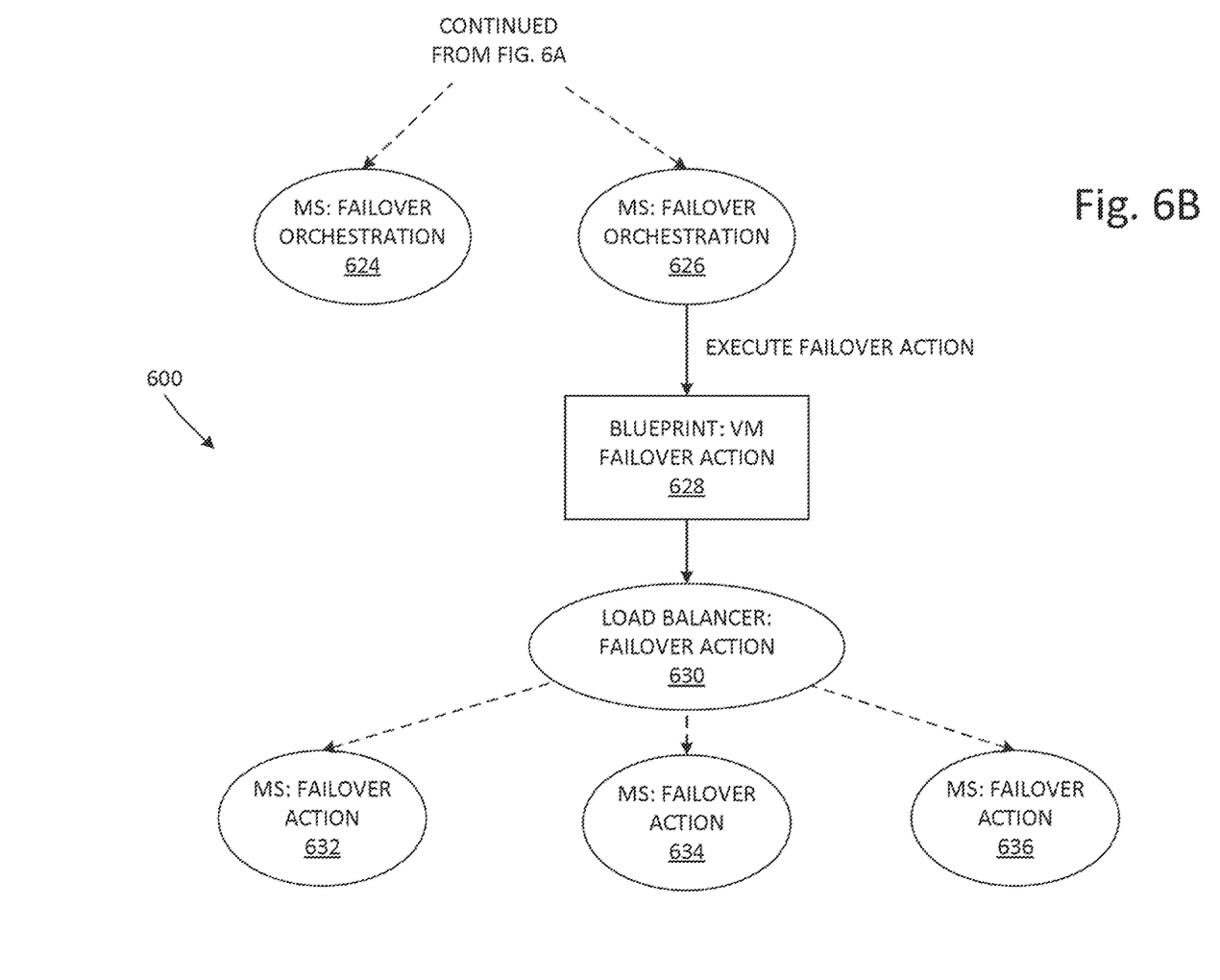

FIGS. 6A and 6B show a diagram 600 of an implementation of blueprints, microservices, and a load balancer in a HA framework, for instance in the context of providing HA protection for VMs against host failures. It is understood that the diagram 600 depicts only examples of some of the types of blueprints, microservices, and load balancing operations that may be executed and the sequence of execution of the blueprints, microservices, and load balancing. Other implementations may use other blueprints, microservices, etc. and in a different execution sequence.

In FIG. 6A, a plurality of blueprints is provided that define entities to be monitored. Such blueprints include a blueprint 602 for datastore monitoring, a blueprint 604 for host monitoring, a blueprint 606 for VM monitoring, a blueprint 608 for network monitoring, etc. A load balancer at 610 balances (depicted in arrows with broken lines in FIGS. 6A and 6B) the execution of host monitoring, for example, amongst a plurality of host monitoring microservices 612-618. Also, the load balancer itself may be a microservice in some implementations.

When a host failure occurs and is detected by the host monitoring service 614, the host monitoring service 614 instantiates and executes a blueprint 620 that specifies failover orchestration for the VMs that reside on the failed host. The failover orchestration specified by the blueprint 620 may dictate, for instance, that the load balancer be called to execute a recommendation algorithm in order to decide on a particular microservice to perform failover orchestration. The load balancer, for example, may select (shown at 622) from amongst several failover orchestration microservices 624 and 626 (shown in FIG. 6B) which in turn decide on the particular failover action that will be taken.

In FIG. 6B, the load balancer selects the microservice 626, and the microservice 626 executes a blueprint 628, which dictates that the load balancer again be called (shown at 630) to balance the execution of the failover action (e.g., VM restart) amongst multiple microservices 632-636. For example, the load balancer may select one or more of the microservices 632-636 to each respectively handle restarting of different VMs from the failed host to new host(s), in a manner such that the restarting operations are balanced between the selected microservices.

Figure 7:
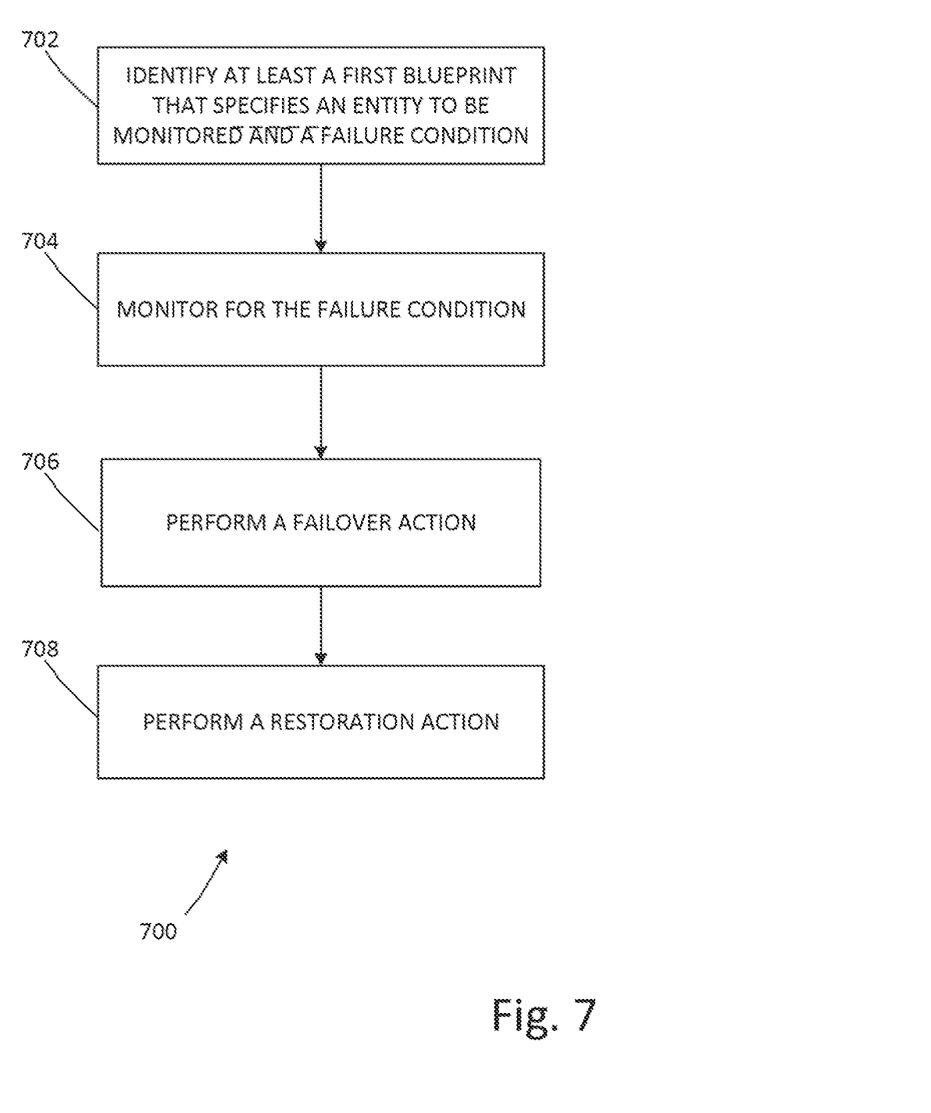
FIG. 7 is a flowchart of an example method that may be performed in the virtualized computing environment of FIG. 1 to provide high availability (including fault tolerance).

FIG. 7 is a flowchart of an example method 700 that may be performed in the virtualized computing environment 100 of FIG. 1 to provide high availability (including fault tolerance). For instance, the method 700 may be performed at least in part by a network device (such as a host or the management server 142) that monitors the condition of another entity and orchestrates HA-related actions if the monitored entity has failed.

The example method 700 may include one or more operations, functions, or actions illustrated by one or more blocks, such as blocks 702 to 708. The various blocks of the method 700 and/or of any other process(es) described herein may be combined into fewer blocks, divided into additional blocks, supplemented with further blocks, and/or eliminated based upon the desired implementation. In one embodiment, the operations of the method 700 and/or of any other process(es) described herein may be performed in a pipelined sequential manner. In other embodiments, some operations may be performed out-of-order, in parallel, in lockstep, etc.

The method 700 may begin at a block 702 ("IDENTIFY AT LEAST A FIRST BLUEPRINT THAT SPECIFIES AN ENTITY TO BE MONITORED AND A FAILURE CONDITION"). For example, one blueprint may specify the hosts or related component (such as a host or a VM that runs on the host) that is to be monitored. The same or another blueprint may also define the failure condition(s) for the entity being monitored. Various other definitions may be specified by the first blueprints at the block 702, such as the definitions previously described above.

The block 702 may be followed by a block 704 ("MONITOR FOR THE FAILURE CONDITION"), wherein a first microservice may execute the first blueprint(s) so as to monitor for the failure condition. If a failure condition is detected by the microservice during the monitoring, the block 704 may be followed by a block 706 ("PERFORM A FAILOVER ACTION").

At the block 706, a second microservice may execute second blueprint(s) that specify a failover action associated with the monitored entity. For example and as previously described above, the failure of a host may result in a failover action (performed at the block 706) in which the VMs on that host are restarted at another host.

At some point, it is possible that the failed entity subsequently recovers from the failure condition, including possibly recovering before or during execution of a failover blueprint. The block 706 may be followed by a block 708 ("PERFORM A RESTORATION ACTION"), wherein a microservice (which monitors the failed host and which executes a blueprint that specifies a recovery condition, such as the failed host coming back online) determines that the entity has recovered from the failure condition. In response, that or some other microservice may execute one or more third blueprints that specifies a restoration action associated with the entity that has recovered. For instance, the restoration action may be performed at the block 708 so as to restore the host or its VM to a state that existed prior to the failure condition, such as by restarting the VM on the recovered host.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1 to 7.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment and/or other type of distributed system), wherein it would be beneficial to provide high availability (including fault tolerance) using blueprints, microservices, load balancing, and/or other features described herein.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

What is claimed is:

1. A method to provide high availability for entities in a computing environment, the method comprising:
   identifying at least a first blueprint that specifies an entity to be monitored and a failure condition for the entity;
   executing the at least the first blueprint to monitor for the failure condition;
   in response to the monitoring having detected the failure condition, executing at least a second blueprint, which specifies a failover action associated with the entity, so as to perform the failover action; and
   in response to determination that the entity has recovered from the failure condition, executing at least a third blueprint, which specifies a restoration action associated with the entity, so as to perform the restoration action that restores the entity or a component related to the entity to a state that existed prior to the failure condition, wherein at least some of the blueprints are available as plug-ins from a cloud environment.

2. The method of claim 1, wherein:
   executing the at least the first blueprint is performed by a first microservice,
   executing the at least the second blueprint is performed by a second microservice,
   executing the at least the third blueprint is performed by a third microservice, and at least some of the microservices are available as plug-ins from the cloud environment.

3. The method of claim 1, wherein the component related to the entity is a computing instance that runs on the entity, and wherein the failover action associated with the entity is a failover action for the entity or for the computing instance.

4. The method of claim 1, further comprising performing load balancing to balance execution of at least some of the first, second, or third blueprints amongst microservices in the computing environment.

5. The method of claim 1, wherein multiple failure conditions are associated with a same third blueprint for restoration.

6. The method of claim 1, wherein multiple third blueprints are associated with the failure condition, and wherein the multiple third blueprints are executed in a particular sequence dependent on whether a previously executed third blueprint amongst the multiple third blueprints has succeeded in restoration of the entity or the component related to the entity to a previous state.

7. The method of claim 1, wherein determination that the entity has recovered from the failure condition is based on whether the entity meets a recovery condition specified by at least a fourth blueprint.

8. A non-transitory computer-readable medium having instructions stored thereon, which in response to execution by one or more processors, cause the one or more processors of a host to perform or control performance of a method to provide high availability for entities in a computing environment, wherein the method comprises:
   identifying at least a first blueprint that specifies an entity to be monitored and a failure condition for the entity;
   executing the at least the first blueprint to monitor for the failure condition;
   in response to the monitoring having detected the failure condition, executing at least a second blueprint, which specifies a failover action associated with the entity, so as to perform the failover action; and
   in response to determination that the entity has recovered from the failure condition, executing at least a third blueprint, which specifies a restoration action associated with the entity, so as to perform the restoration action that restores the entity or a component related to the entity to a state that existed prior to the failure condition, wherein at least some of the blueprints are available as plug-ins from a cloud environment.

9. The non-transitory computer-readable medium of claim 8, wherein:
   executing the at least the first blueprint is performed by a first microservice,
   executing the at least the second blueprint is performed by a second microservice,
   executing the at least the third blueprint is performed by a third microservice, and
   at least some of the microservices are available as plug-ins from the cloud environment.

10. The non-transitory computer-readable medium of claim 8, wherein the component related to the entity is a computing instance that runs on the entity, and wherein the failover action associated with the entity is a failover action for the entity or for the computing instance.

11. The non-transitory computer-readable medium of claim 8, wherein the method further comprises performing load balancing to balance execution of at least some of the first, second, or third blueprints amongst microservices in the computing environment.

12. The non-transitory computer-readable medium of claim 8, wherein multiple failure conditions are associated with a same third blueprint for restoration.

13. The non-transitory computer-readable medium of claim 8, wherein multiple third blueprints are associated with the failure condition, and wherein the multiple third blueprints are executed in a particular sequence dependent on whether a previously executed third blueprint amongst the multiple third blueprints has succeeded in restoration of the entity or the component related to the entity to a previous state.

14. The non-transitory computer-readable medium of claim 8, wherein determination that the entity has recovered from the failure condition is based on whether the entity meets a recovery condition specified by at least a fourth blueprint.

15. A network device to provide high availability for entities in a computing environment, the network device comprising:
   one or more processors; and
   a non-transitory computer-readable medium coupled to the one or more processors, and having instructions stored thereon, which in response to execution by the one or more processors, cause the one or more processors to perform or control performance of operations that include:
      identify at least a first blueprint that specifies an entity to be monitored and a failure condition for the entity;
      execute the at least the first blueprint to monitor for the failure condition;
      in response to the monitoring having detected the failure condition, execute at least a second blueprint, which specifies a failover action associated with the entity, so as to perform the failover action; and
      in response to determination that the entity has recovered from the failure condition, execute at least a third blueprint, which specifies a restoration action associated with the entity, so as to perform the restoration action that restores the entity or a component related to the entity to a state that existed prior to the failure condition, wherein at least some of the blueprints are available as plug-ins from a cloud environment.

16. The network device of claim 15, wherein:
   execution of the at least the first blueprint is performed by a first microservice,
   execution of the at least the second blueprint is performed by a second microservice,
   execution of the at least the third blueprint is performed by a third microservice, and
   at least some of the microservices are available as plug-ins from the cloud environment.

17. The network device of claim 15, wherein the component related to the entity is a computing instance that runs on the entity, and wherein the failover action associated with the entity is a failover action for the entity or for the computing instance.

18. The network device of claim 15, wherein the operations further include:
   perform load balancing to balance execution of at least some of the first, second, or third blueprints amongst microservices in the computing environment.

19. The network device of claim 15, wherein multiple failure conditions are associated with a same third blueprint for restoration.

20. The network device of claim 15, wherein multiple third blueprints are associated with the failure condition, and wherein the multiple third blueprints are executed in a particular sequence dependent on whether a previously executed third blueprint amongst the multiple third blueprints has succeeded in restoration of the entity or the component related to the entity to a previous state.

21. The network device of claim 15, wherein determination that the entity has recovered from the failure condition is based on whether the entity meets a recovery condition specified by at least a fourth blueprint.

\* \* \* \* \*